United States Patent
Yang

(10) Patent No.: US 7,551,251 B2
(45) Date of Patent: Jun. 23, 2009

(54) LIQUID CRYSTAL DISPLAY DEVICE HAVING A COMPENSATION FILM WITH A PHASE RETARDATION

(75) Inventor: Hui-Wen Yang, Tainan County (TW)

(73) Assignee: Chi Mei Optoelectronics Corp. (TW)

( * ) Notice: Subject to any disclaimer, the term of this patent is extended or adjusted under 35 U.S.C. 154(b) by 527 days.

(21) Appl. No.: 11/031,270

(22) Filed: Jan. 7, 2005

(65) Prior Publication Data
US 2005/0151904 A1   Jul. 14, 2005

(30) Foreign Application Priority Data
Jan. 9, 2004   (TW) .............................. 93100503 A

(51) Int. Cl.
*G02F 1/1335* (2006.01)
(52) U.S. Cl. ..................................... 349/117
(58) Field of Classification Search ................. 349/117, 349/118, 119
See application file for complete search history.

(56) References Cited

U.S. PATENT DOCUMENTS

| | | | |
|---|---|---|---|
| 6,964,795 B2 * | 11/2005 | Elman et al. ................. | 428/1.3 |
| 7,075,609 B2 * | 7/2006 | Ohmuro et al. ............. | 349/130 |
| 2003/0011732 A1 * | 1/2003 | Ishihara et al. .............. | 349/117 |
| 2003/0193635 A1 * | 10/2003 | Mi et al. ...................... | 349/117 |
| 2006/0060821 A1 * | 3/2006 | Fujisawa et al. ........ | 252/299.01 |
| 2006/0164579 A1 * | 7/2006 | Yano .......................... | 349/117 |

FOREIGN PATENT DOCUMENTS

EP    1045261 A1  * 10/2000

* cited by examiner

*Primary Examiner*—David Nelms
*Assistant Examiner*—Nathanael R Briggs
(74) *Attorney, Agent, or Firm*—Trop, Pruner & Hu, P.C.

(57) ABSTRACT

Disclosed is a liquid crystal display device including a liquid crystal layer sandwiched between two substrates; two polarizers each provided on an outer side of respective one of the first and second substrates; and a compensation film provided between the polarizer and the substrate, wherein the retardation of the biaxial film satisfies the following formulae (1)-(3) and/or (4)-(5):

$$1 \leq R_0(450)/R_0(\lambda_0) \leq 1.3 \quad (1)$$

$$1.1 \leq R_0(650)/R_0(\lambda_0) \leq 2.1 \quad (2)$$

$$100\,\text{nm} \leq R_0(\lambda_0) \leq 240\,\text{nm} \quad (3)$$

$$1 \leq R_0(380)/R_0(\lambda_0) \leq 2 \quad (4)$$

$$1.2 \leq R_0(780)/R_0(\lambda_0) \leq 2.7 \quad (5)$$

where $R_0(380)$, $R_0(450)$, $R_0(650)$, $R_0(780)$ and $R_0(\lambda_0)$ represent the retardation of the biaxial film at wavelengths of 380 nm, 450 nm, 650 nm, 780 nm and $\lambda_0$, respectively, and $\lambda_0$ is the value calculated by $\lambda_0=[n_e-n_o]\times d/k$ (where $n_e$ and $n_o$ represent the refractive indices of the liquid crystal, d represents the cell gap defined between the two substrates, and k is a constant, $0.55 \leq k \leq 1$).

20 Claims, 4 Drawing Sheets

LIQUID CRYSTAL DISPLAY DEVICE HAVING A COMPENSATION FILM WITH A PHASE RETARDATION

FIELD OF THE INVENTION

The present invention relates to a liquid crystal display device, and more particularly to a liquid crystal display device comprising an optical compensator used for increasing the viewing angle of a liquid crystal display device.

BACKGROUND OF THE INVENTION

Recently, many kinds of liquid crystal display device mode and compensation film have been proposed to increase the viewing angle of a liquid crystal display device. An In-Plane Switching (IPS) liquid crystal display device is one typical example with a wide viewing angle. In an ISP liquid crystal display device, liquid crystal molecules move over a planar surface substantially parallel to a substrate by an electric field parallel to the substrate.

Compared to a Twisted Nematic crystal display device, an ISP liquid crystal display device provides higher contrast and better viewing angle quality for black and white displaying. However, the contrast ratio decreases at a large viewing angle due to light leaking in the dark, thereby resulting in the problems of insufficient viewing angle or color shift.

The leaking light of an off axis angle as a liquid crystal display device is in the dark state has two main reasons: (1) at an off axis viewing angle the polarizers are never orthogonal; (2) at an off axis viewing angle the optical phase retardation of liquid crystal layer changes the polarization of the incident light.

There are currently two main solutions: (1) using the phase retardation resulting from a negative optical anisotropic compensation film to compensate the phase retardation resulting from a positive optical anisotropic liquid crystal layer as disclosed in Japan Laid-Open No.2002-55341A; (2) using a wide viewing angle polarizer (see SID00 at p.1094 and Japan Laid-Open No. 2001-350022A.). However, the solution (1) does not totally solve the leaking light of an off axis angle in the dark state, wherein the leaking light results from polarizers being not orthogonal. As for the solution (2), at an off axis viewing angle, although the polarizers keep orthogonal, the leaking light of an off axis viewing angle is still caused by the optical phase retardation made from a liquid crystal layer. Therefore, these two solutions do not totally solve the leaking light in the dark state at an off axis viewing angle, and they also do not solve the general color shift as a liquid crystal display device is at an off axis sloping viewing angle in the dark state.

SUMMARY OF THE INVENTION

The object of the present invention is to provide a liquid crystal display device that can simultaneously solve the problems of leaking light in the dark state caused by the polarizers and a liquid crystal layer and color shift at an off axis viewing angle.

For the above-mentioned and other objects, the present invention provides a liquid crystal display device comprising a liquid crystal layer sandwiched between two substrates, two polarizers disposed respectively on the outer sides of the two substrates, and a compensation film disposed between the polarizer and the substrate. The retardation of the compensation film satisfies the following formulae (1)-(3) and/or (4)-(5):

$$1 \leq R_0(450)/R_0(\lambda_0) \leq 1.3 \quad (1)$$

$$1.1 \leq R_0(650)/R_0(\lambda_0) \leq 2.1 \quad (2)$$

$$100 \text{ nm} \leq R_0(\lambda_0) \leq 240 \text{ nm} \quad (3)$$

$$1 \leq R_0(380)/R_0(\lambda_0) \leq 2 \quad (4)$$

$$1.2 \leq R_0(780)/R_0(\lambda_0) \leq 2.7 \quad (5)$$

where $R_0(380)$, $R_0(450)$, $R_0(650)$, $R_0(780)$ and $R_0(\lambda_0)$ represent the retardation of the compensation film at the wavelengths of 380 nm, 450 nm, 650 nm, 780 nm and $\lambda_0$, respectively, and $\lambda_0$ is the value calculated by $\lambda_0 = [n_e - n_o] \times d/k$ wherein $n_e$ and $n_o$ represent the refractive indices of the liquid crystal, d represents the cell gap defined between the two substrates and k is a constant, $0.55 \leq k \leq 1$. Preferably, the retardation of the compensation film satisfies the following formulae (6)-(8) and/or (9)-(10):

$$1 \leq Nz(450)/Nz(\lambda_0) \leq 1.3 \quad (6)$$

$$1 \leq Nz(650)/Nz(\lambda_0) \leq 3 \quad (7)$$

$$0.1 \leq Nz(\lambda_0) \leq 0.5 \quad (8)$$

$$1 \leq Nz(380)/Nz(\lambda_0) \leq 3 \quad (9)$$

$$1 \leq Nz(780)/Nz(\lambda_0) \leq 5 \quad (10)$$

wherein $Nz(380)$, $Nz(450)$, $Nz(650)$, $Nz(780)$ and $Nz(\lambda_0)$ represent the Nz value of the compensation film at the wavelengths of 380 nm, 450 nm, 650 nm, 780 nm and $\lambda_0$ whose definition is the same as above-mentioned respectively, and $Nz = [n_x - n_z]/[n_x - n_y]$ wherein $n_x$, $n_y$ and $n_z$ represent the 3-dimension refractive indices of the compensation film in the axes of X, Y and Z respectively.

Preferably, the retardation of the compensation film satisfies the following formulae (11)-(13) and/or (14)-(15):

$$1 \leq Rth(450)/Rth(\lambda_0) \leq 1.2 \quad (11)$$

$$1.2 \leq Rth(650)/Rth(\lambda_0) \leq 5 \quad (12)$$

$$10 \text{ nm} \leq Nz(\lambda_0) \leq 120 \text{ nm} \quad (13)$$

$$1 \leq Rth(380)/Rth(\lambda_0) \leq 6 \quad (14)$$

$$1.8 \leq Rth(780)/Rth(\lambda_0) \leq 7.1 \quad (15)$$

wherein $Rth(380)$, $Rth(450)$, $Rth(650)$, $Rth(780)$ and $Rth(\lambda_0)$ represent the Rth value of the compensation film at the wavelengths of 380 nm, 450 nm, 650 nm, 780 nm and $\lambda_0$ whose definition is the same as above-mentioned, respectively, and $Rth = [n_x - n_z] \times d'$ wherein $n_x$ and $n_z$ represent the 3-dimension refractive indices of the compensation film in the axes of X and Z respectively and d' represents the thickness of the compensation film.

In accordance with the compensation film of the present invention, since the phase retardation of the wavelength dispersion properties of the compensation film is optimized for different wavelengths, all of incident light of any wavelength has better compensation, since the transmission rate of the overall dark state decreases and there is no color shift. It is understood that the compensation film may be formed by materials of the above wavelength dispersion properties that satisfies the range of the above-defined optical parameters, such as Ro, Rth or Nz. In addition, the compensation film may also be formed by combining at least two compensation films that have different wavelength dispersion properties, as long as it substantially has the above-mentioned wavelength dispersion properties.

DETAILED DESCRIPTION OF THE PREFERED EMBODIMENTS

Figure 1:
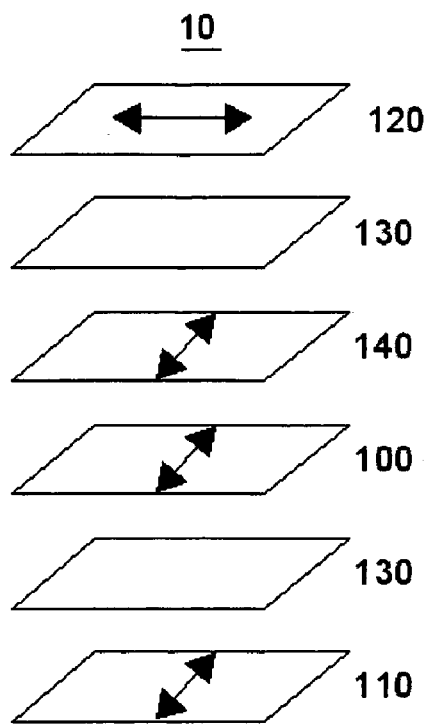
FIG. 1 shows the schematic drawing of a liquid crystal display device in accordance with the present invention.

FIG. 1 shows a liquid crystal display device 10 comprising an IPS liquid crystal display device unit 100 sandwiched between two polarizers 110, 120, wherein the arrows show their rubbing directions. The polarizer generally comprises an absorption layer, for example, a polyvinyl chloride (PVC) layer. The polarizers 110, 120 are crossly disposed with each other so that their absorption axes (arrows in FIG. 1) are perpendicular to each other. Triacetate cellulose (TAC) fiber layers 130 are placed between the liquid crystal display device unit 100 and two polarizers 110, 120, respectively. The liquid crystal display device 10 has a compensation film 140, whose slow axis is shown by arrow in FIG. 1, sandwiched between the triacetate cellulose (TAC) fiber layer 130 and liquid crystal display device unit 100 to reduce the leaking light in dark state and increase the contrast. A general and conventional compensation film is used for the optimization of the green light (550 nm) because human eyes are very sensitive to the green light.

Because the transmission rate of light depends on the electric field polarization and correspondence of polarizers, and the polarization depends on the phase difference resulting from light passing through the liquid crystal layer of the display device unit 100 and other optically anisotropic devices (e.g., TAC film 130). Therefore, because different wavelengths have different polarization, the compensation films 140 require different phase retardation. For a general IPS liquid crystal display device, the phase retardation value (Retar.) of liquid crystal is about 250-380 nm ($\lambda$=550 nm), and the optical parameter $R_{th}$ of TAC film 130 is about 20-70 nm, wherein $R_{th}=(n_x-n_z)d$, $n_x$ and $n_z$ represent the 3-dimension refractive indices of the TAC film in the axes of X and Z respectively and d represents the film thickness.

Thus, in the present invention, the above-mentioned ranges were studied to have the phase retardation required by the compensation film 140 after optimization. The liquid crystal display device setup conditions of each embodiment are in Table 1.

TABLE 1

| | The liquid crystal display device setup conditions | | |
|---|---|---|---|
| Embodiments | LC Retar. | TAC $R_{th}$ | TAC Thickness |
| A | 280 nm | 51.2 nm | 80 μm |
| B | 325 nm | 51.2 nm | 80 μm |
| C | 325 nm | 25.6 nm | 40 μm |
| D | 325 nm | 0 | 0 |

Some liquid crystal display device related simulation equations (LCD Master (Shintech Co., Ltd.)) and the Poincare sphere method were used for the liquid crystal display device setup conditions of each above-mentioned embodiment to find the optical parameters (Ro, Rth or Nz) of the compensation film after optimization. The results are in Table 2-4. The above-mentioned simulation is made from the liquid crystal display device 10 structure of FIG. 1. The polarizers 110, 120 are the polarizers SRW862 bought from Sumitomo Chemical Co., Ltd.

TABLE 2

| | The optical parameters $R_0$ of the compensation film after optimization | | | | | | |
|---|---|---|---|---|---|---|---|
| Embodiments | $\lambda_o$ | $R_0(\lambda_0)$ | k | $R_0(380)/R_0(\lambda_0)$ | $R_0(450)/R_0(\lambda_0)$ | $R_0(650)/R_0(\lambda_0)$ | $R_0(780)/R_0(\lambda_0)$ |
| A | 470 nm | 116 nm | 0.59 | 1.67 | 1.04 | 1.69 | 2.35 |
| B | 510 nm | 119 nm | 0.64 | 1.32 | 1.14 | 1.42 | 1.99 |
| C | 490 nm | 183 nm | 0.66 | 1.07 | 1.02 | 1.24 | 1.66 |
| D | 380 nm | 196 nm | 0.85 | 1 | 1.11 | 1.57 | 1.86 |

$\lambda_o$ is the corresponding wavelength as the $R_0$ value of the compensation film is the minimal. $R_0(380)$, $R_0(450)$, $R_0(650)$, $R_0(780)$ and $R_0(\lambda_0)$ represent the phase retardation $R_0$ of the compensation film at wavelengths of 380 nm, 450 nm, 650 nm, 780 nm and $\lambda_0$, respectively. ($R_0=[n_x-n_y]\times d$, wherein $n_x$ and $n_y$ represent the 3-dimension refractive indices of the compensation film in the axes of X and Y respectively and d represents the thickness of the compensation film.) $k=[n_e-n_o]\times d/\lambda_0$ wherein $n_e$ and $n_o$ represent the refractive indices of the liquid crystal, and d represents the cell gap defined between the two substrates.

According to the results in Table 2, it is further summarized that the optical parameters $R_0$ of the compensation film after optimization satisfy the following formulae (1)-(3) and/or (4)-(5):

$1 \leq R_0(450)/R_0(\lambda_0) \leq 1.3$          (1)

$1.1 \leq R_0(650)/R_0(\lambda_0) \leq 2.1$        (2)

$100 \text{ nm} \leq R_0(\lambda_0) \leq 240 \text{ nm}$       (3)

$1 \leq R_0(380)/R_0(\lambda_0) \leq 2$          (4)

$1.2 \leq R_0(780)/R_0(\lambda_0) \leq 2.7$       (5)

where $\lambda_0 = [n_e - n_o] \times d/k$ and $0.55 \leq k \leq 1$.

TABLE 3

The optical parameters Nz of the compensation film after optimization

| Embodiments | $\lambda_o$ | $Nz(\lambda_0)$ | k | $Nz(380)/Nz(\lambda_0)$ | $Nz(450)/Nz(\lambda_0)$ | $Nz(650)/Nz(\lambda_0)$ | $Nz(780)/Nz(\lambda_0)$ |
|---|---|---|---|---|---|---|---|
| A | 450 nm | 0.2 | 0.62 | 2.75 | 1 | 2.75 | 3 |
| B | 490 nm | 0.17 | 0.66 | 2.82 | 1.1 | 2.82 | 3.41 |
| C | 470 nm | 0.35 | 0.69 | 1.37 | 1.06 | 1.49 | 1.6 |
| D | 380 nm | 0.48 | 0.85 | 1 | 1.02 | 1.06 | 1.08 |

$\lambda_0$ is the corresponding wavelength as the Nz value of the compensation film is the minimal. Nz(380), Nz(450), Nz(650), Nz(780) and Nz($\lambda_0$) represent the Nz value of the compensation film at wavelengths of 380 nm, 450 nm, 650 nm, 780 nm and $\lambda_0$ whose definition is as the same as above-mentioned respectively, and $Nz = [n_x - n_z]/[n_x - n_y]$ wherein $n_x$, $n_y$ and $n_z$ represent the 3-dimension refractive indices of the compensation film in the axes of X, Y and Z respectively. $k = [n_e - n_o] \times d/\lambda_0$ wherein $n_e$ and $n_o$ represent the refractive indexes of the liquid crystal and d represents the cell gap defined between the two substrates.

According to the results in Table 3, it is further summarized that the optical parameters Nz of the compensation film after optimization satisfy the following formulae (6)-(8) and/or (9)-(10):

$1 \leq Nz(450)/Nz(\lambda_0) \leq 1.3$         (6)

$1 \leq Nz(650)/Nz(\lambda_0) \leq 3$          (7)

$0.1 \leq Nz(\lambda_0) \leq 0.5$            (8)

$1 \leq Nz(380)/Nz(\lambda_0) \leq 3$          (9)

$1 \leq Nz(780)/Nz(\lambda_0) \leq 5$         (10)

where $\lambda_0 = [n_e - n_o] \times d/k$ and $0.55 \leq k \leq 1$.

TABLE 4

The optical parameters Rth of the compensation film after optimization

| Embodiments | $\lambda_o$ | $Rth(\lambda_0)$ | k | $Rth(380)/Rth(\lambda_0)$ | $Rth(450)/Rth(\lambda_0)$ | $Rth(650)/Rth(\lambda_0)$ | $Rth(780)/Rth(\lambda_0)$ |
|---|---|---|---|---|---|---|---|
| A | 450 nm | 24.06 | 0.62 | 1.53 | 1 | 4.48 | 6.78 |
| B | 490 nm | 21.53 | 0.66 | 3.48 | 1.06 | 3.76 | 6.36 |
| C | 470 nm | 62.47 | 0.69 | 1.51 | 1.06 | 1.89 | 2.72 |
| D | 380 nm | 94.24 | 0.85 | 1 | 1.14 | 1.67 | 2.02 |

$\lambda_0$ is the corresponding wavelength as the Rth value of the compensation film is the minimal. Rth(380), Rth(450), Rth(650), Rth(780) and Rth($\lambda_0$) represent the Rth value of the compensation film at wavelengths of 380 nm, 450 nm, 650 nm, 780 nm and $\lambda_0$ whose definition is as the same as above-mentioned respectively, and $Rth = [n_x - n_z] \times d'$ wherein $n_x$ and $n_z$ represent the 3-dimension refractive indices of the compensation film in the axes of X and Z respectively, and d' represents the thickness of the compensation film. $k = [n_e - n_o] \times d/\lambda_0$ wherein $n_e$ and $n_o$ represent the refractive indices of the liquid crystal and d represents the cell gap defined between the two substrates.

According to the results in Table 4, it is further summarized that the optical parameters Rth of the compensation film after optimization satisfy the following formulae (11)-(13) and/or (14)-(15):

$1 \leq Rth(450)/Rth(\lambda_0) \leq 1.2$       (11)

$1.2 \leq Rth(650)/Rth(\lambda_0) \leq 5$       (12)

$10 \text{ nm} \leq Nz(\lambda_0) \leq 120 \text{ nm}$      (13)

$1 \leq Rth(380)/Rth(\lambda_0) \leq 6$         (14)

$1.8 \leq Rth(780)/Rth(\lambda_0) \leq 7.1$     (15)

where $\lambda_0 = [n_e - n_o] \times d/k$ and $0.55 \leq k \leq 1$.

Figure 2:
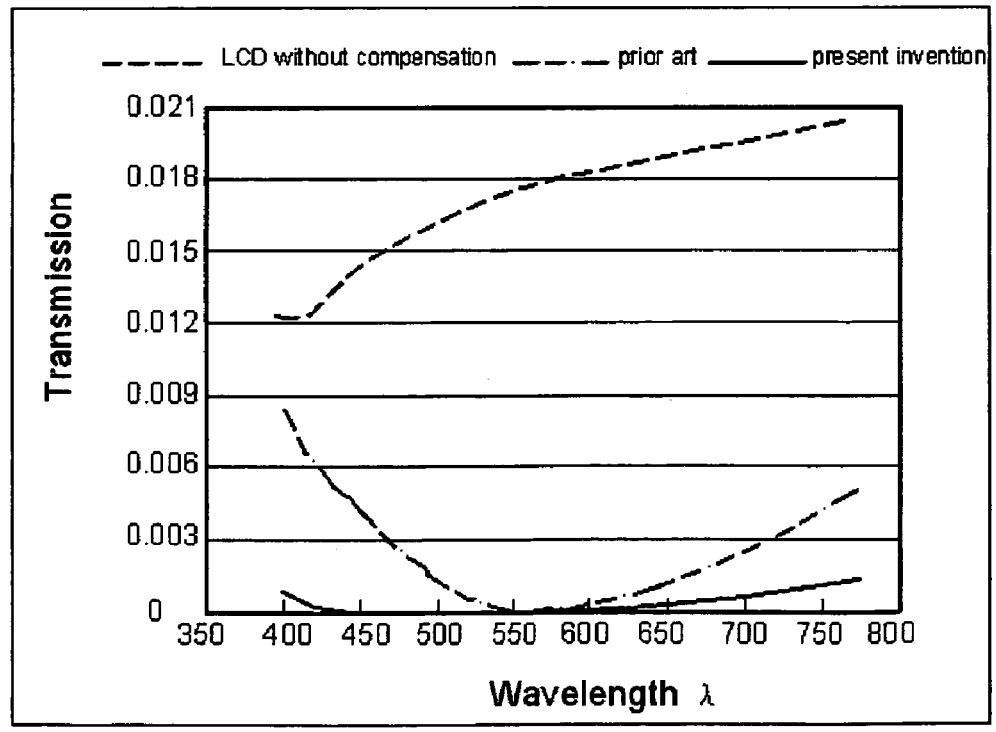
FIG. 2 shows the relationships between the transmission rate in the dark state and wavelengths for the liquid crystal display device with the conventional compensation film and for the liquid crystal display device with the compensation film of the present invention.

FIG. 2 shows the relationships between the transmission rate in dark state and wavelength for the liquid crystal display device with the conventional compensation film, NRZ film bought from Nitto Denko Corporation and for the liquid crystal display device with the above-mentioned compensation film (Embodiment B) at the off axis viewing angle (or polar angle $\Theta$ ), 60 degree and azimuthal angle ($\Phi$), 45 degree. According to the figure, for the prior art, the conventional compensation film is used for optical compensation, and because there is only green light optimized and the transmission rate of blue and red wave bands does not decrease to the same extent, it leads to that the dark state at the off axis angle shows color shift but not colorless dark state. Compara- tively, for the present invention, the above-mentioned compensation film (Embodiment B) is used for optical compensation, and because the wavelength dispersion property of the phase retardation is optimized for different wavelengths respectively, the incident light of each wavelength has better compensation so that the overall transmission rate in the dark decreases and there is no color shift.

Figure 3:
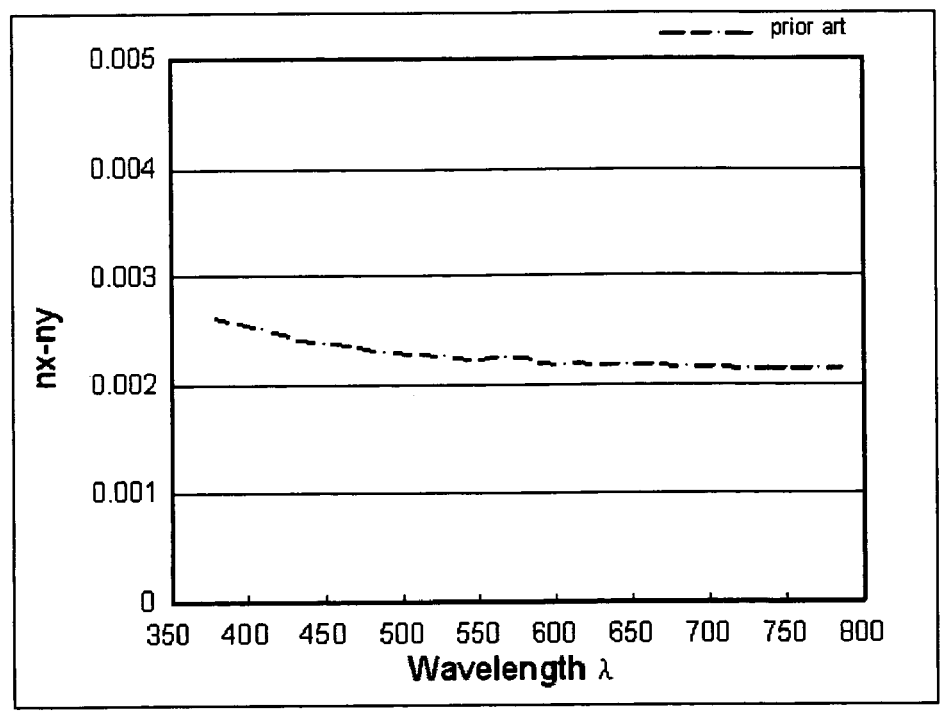
FIG. 3 shows the relationship between the optical refractive index anisotropy, $n_x-n_y$, of the conventional compensation film and the wavelength.
Figure 4:
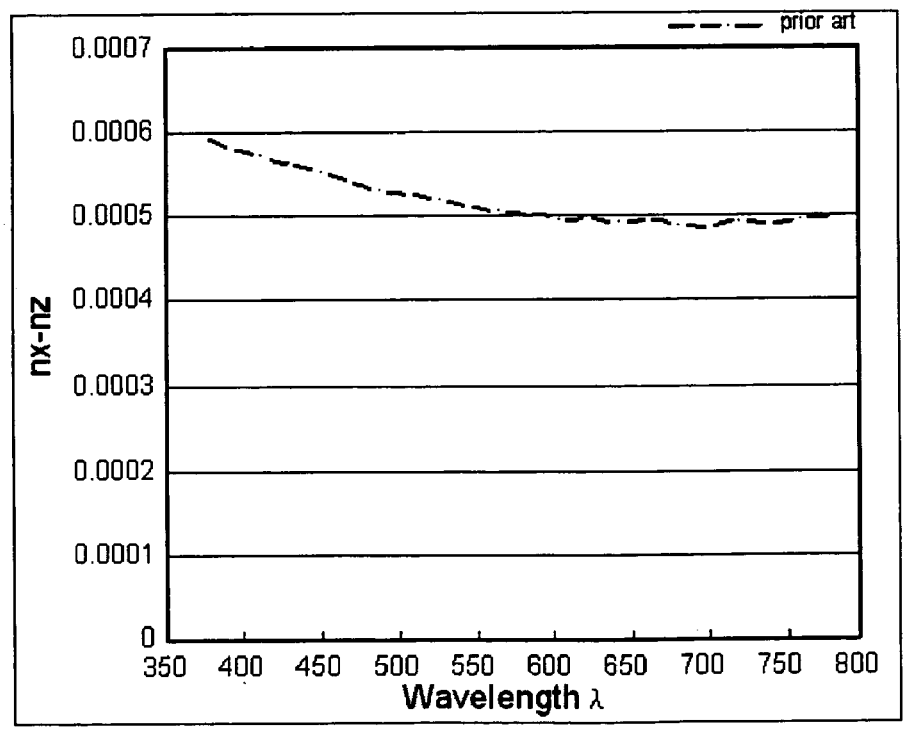
FIG. 4 shows the relationship between the optical refractive index anisotropy, $n_x-n_z$, of the conventional compensation film and the wavelength.
Figure 5:
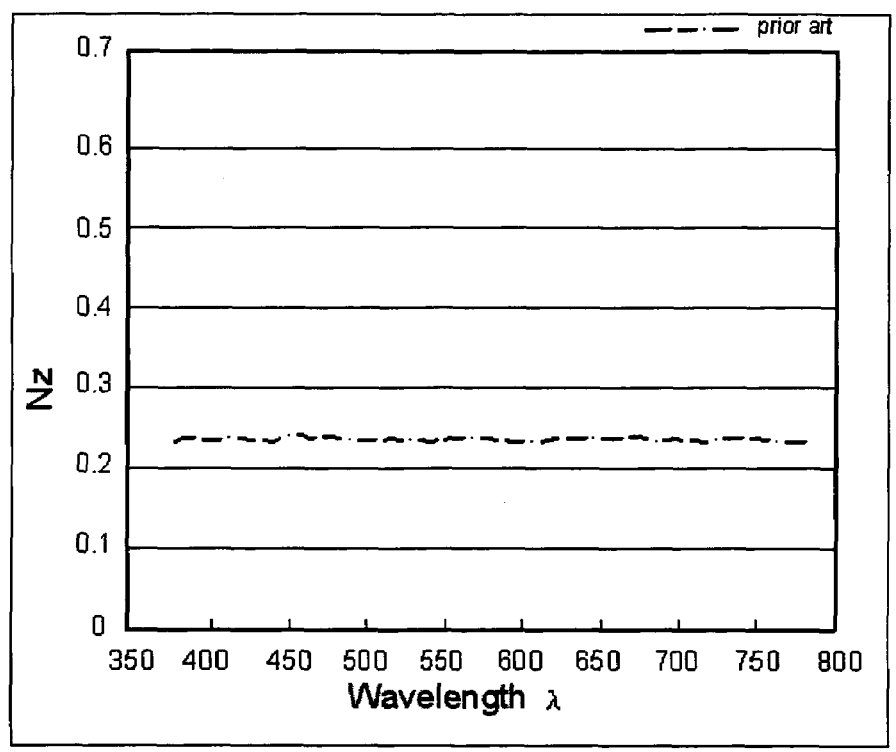
FIG. 5 shows the relationship between the optical parameter Nz of the conventional compensation film and the wavelength.

FIG. 3 shows the relationship between the optical refractive index anisotropy, $n_x-n_y$, of the above-mentioned conventional compensation film and the wavelength. FIG. 4 shows the relationship between the optical refractive index anisotropy, $n_x-n_z$, of the above-mentioned conventional compensation film and the wavelength. FIG. 5 shows the relationship between the optical parameter Nz of the above-mentioned conventional compensation film and the wavelength. According to FIGS. 3-5, the optical refractive index anisotropies, $n_x-n_y$ and $n_x-n_z$, or the optical parameter Nz of the above-mentioned conventional compensation film all have the decreasing trend and approach to a constant.

Figure 6:
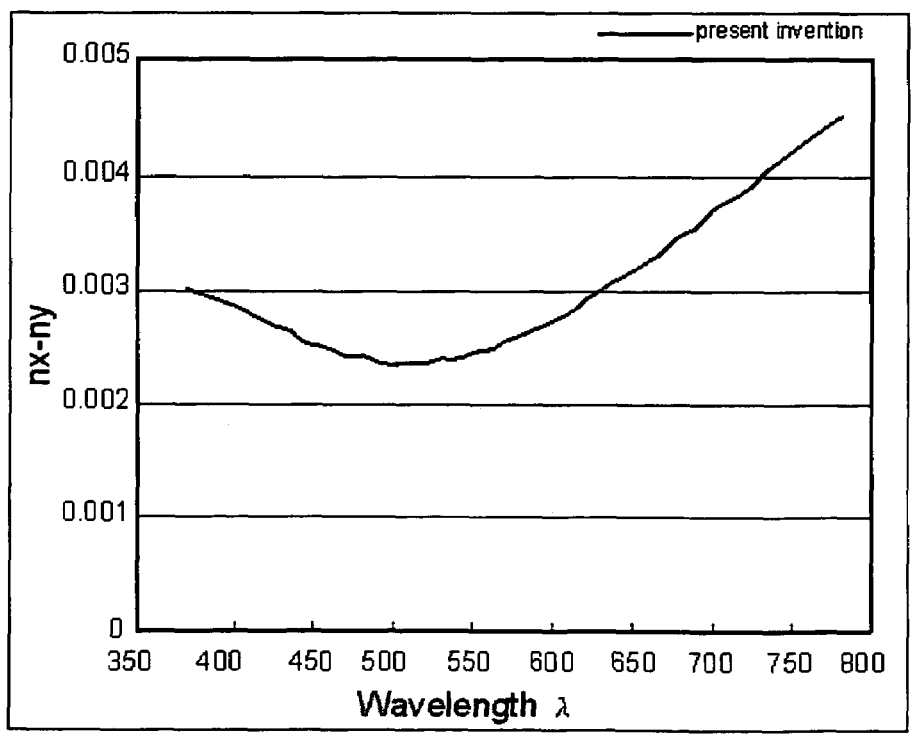
FIG. 6 shows the relationship between the optical refractive index anisotropy, $n_x-n_y$, of the compensation film of the present invention and the wavelength.
Figure 7:
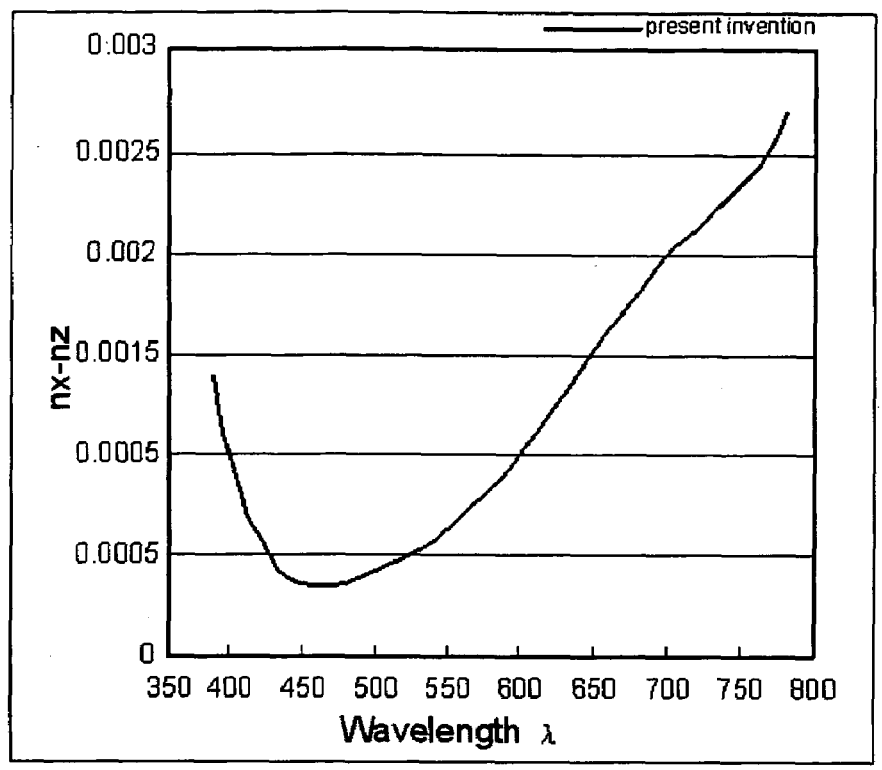
FIG. 7 shows the relationship between the optical refractive index anisotropy, $n_x-n_z$, of the compensation film of the present invention and the wavelength.
Figure 8:
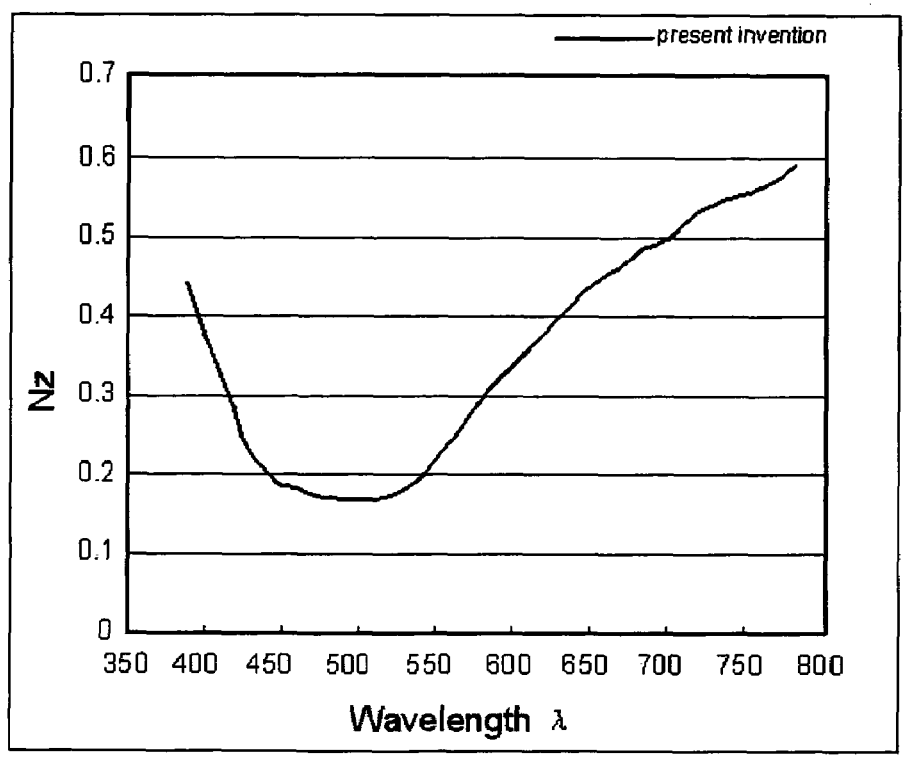
FIG. 8 shows the relationship between the optical parameter Nz of the compensation film of the present invention and the wavelength.

FIG. 6 shows the relationship between the optical refractive index anisotropy, $n_x-n_y$, of the above-mentioned optimized compensation film (Embodiment B) and the wavelength. FIG. 7 shows the relationship between the optical refractive index anisotropy, $n_x-n_z$, of the above-mentioned optimized compensation film (Embodiment B) and the wavelength. FIG. 8 shows the relationship between the optical parameter Nz of the above-mentioned optimized compensation film and the wavelength. According to these figures, the optical refractive index anisotropies, $n_x-n_y$ and $n_x-n_z$, or the optical parameter Nz of the optimized compensation film of the present invention all have the downward contours.

According to the compensation film of the present invention, because the wavelength dispersion property of the phase retardation is optimized for different wavelengths respectively, the incident light of each wavelength has better compensation so that the overall transmission rate in the dark decreases and there is no color shift. It is understood that the compensation film may be formed by materials of the above wavelength dispersion properties which satisfie the range of the above-defined optical parameters, such as Ro, Rth or Nz. In addition, the compensation film may also be formed by combining at least two compensation films that have different wavelength dispersion properties, as long as it substantially has the above-mentioned wavelength dispersion properties.

Although the present invention is disclosed by the above-mentioned preferred embodiments, they will not limit the present invention. Any one who is skilled in the art may make any change or modification within the spirit and scope of the present invention. Therefore, the protection scope of the present invention should be considered as the appended claims.

What is claimed is:

1. A liquid crystal display device, comprising:
   two substrates;
   a liquid crystal layer sandwiched between the two substrates;
   two polarizers, wherein the two substrates are between the two polarizers; and
   a compensation film provided between one of the polarizers and one of the substrates;
   wherein a phase retardation, $R_0$, of the compensation film satisfies the following formulae (1)-(3):

$$1 < R_0(450)/R_0(\lambda_0) \leq 1.3, \quad (1)$$

$$1.1 \leq R_0(650)/R_0(\lambda_0) \leq 2.1, \quad (2)$$

$$100 \text{ nm} \leq R_0(\lambda_0) \leq 240 \text{ nm}, \quad (3)$$

wherein $R_0(450)$, $R_0(650)$ and $R_0(\lambda_0)$ represent the phase retardation of the compensation film at wavelengths of 450 nm, 650 nm, and $\lambda_0$, respectively, and $\lambda_0 = [n_e - n_o] \times d/k$, where 450 nm $\leq \lambda_0 \leq$ 650 nm, and where $n_e$ and $n_o$ represent refractive indices of the liquid crystal layer, d represents a cell gap defined between the two substrates and k is a constant, $0.55 \leq k \leq 1$.

2. The liquid crystal display device of claim 1, wherein the phase retardation, $R_0$, of the compensation film further satisfies the following formulae (4)-(5):

$$1 \leq R_0(380)/R_0(\lambda_0) \leq 2, \quad (4)$$

$$1.2 \leq R_0(780)/R_0(\lambda_0) \leq 2.7, \quad (5)$$

wherein $R_0(380)$ and $R_0(780)$ represent the phase retardation of the compensation film at wavelengths of 380 nm and 780 nm, respectively.

3. The liquid crystal display device of claim 1, wherein an optical parameter, Nz, of the compensation film satisfies the following formulae (6)-(8):

$$1 \leq Nz(450)/Nz(\lambda_0) \leq 1.3, \quad (6)$$

$$1 \leq Nz(650)/Nz(\lambda_0) \leq 3, \quad (7)$$

$$0.1 \leq Nz(\lambda_0) \leq 0.5, \quad (8)$$

wherein $Nz(450)$, $Nz(650)$ and $Nz(\lambda_0)$ represent the Nz value of the compensation film at wavelengths of 450 nm, 650 nm and $\lambda_0$, respectively, and $Nz = [n_x - n_z]/[n_x - n_y]$ wherein $n_x$, $n_y$, and $n_z$ represent 3-dimension refractive indices of the compensation film in axes X, Y, and Z, respectively.

4. The liquid crystal display device of claim 3, wherein the optical parameter, Nz, of the compensation film further satisfies the following formulae (9)-(10):

$$1 \leq Nz(380)/Nz(\lambda_0) \leq 2, \quad (9)$$

$$1.2 \leq Nz(780)/Nz(\lambda_0) \leq 2.7, \quad (10)$$

wherein $Nz(380)$ and $Nz(780)$ represent the Nz value of the compensation film at wavelengths of 380 nm and 780 nm, respectively.

5. The liquid crystal display device of claim 1, wherein an optical parameter, Rth, of the compensation film satisfies the following formulae (11)-(13):

$$1 \leq Rth(450)/Rth(\lambda_0) \leq 1.2, \quad (11)$$

$$1.2 \leq Rth(650)/Rth(\lambda_0) \leq 5, \quad (12)$$

$$10 \text{ nm} \leq Rth(\lambda_0) \leq 120 \text{ nm}, \quad (13)$$

wherein $Rth(450)$, $Rth(650)$ and $Rth(\lambda_0)$ represent the Rth value of the compensation film at wavelengths of 450 nm, 650 nm and $\lambda_0$, respectively, and $Rth = [n_x - n_z] \times d'$, wherein $n_x$ and $n_z$ represent 3-dimension refractive indices of the compensation film in axes X and Z, respectively, and d' represents a thickness of the compensation film.

6. The liquid crystal display device of claim 5, wherein the optical parameter, Rth, of the compensation film further satisfies the following formulae (14)-(15):

$$1 \leq Rth(380)/Rth(\lambda_0) \leq 6, \quad (14)$$

$$1.8 \leq Rth(780)/Rth(\lambda_0) \leq 7.1, \quad (15)$$

wherein $Rth(380)$ and $Rth(780)$ represent the Rth value of the compensation film at wavelengths of 380 nm and 780 nm, respectively.

7. The liquid crystal display device of claim 1, wherein the compensation film is formed by combining at least two compensation films that have different wavelength dispersion properties.

8. A liquid crystal display device, comprising:
two substrates;
a liquid crystal layer sandwiched between the two substrates;
two polarizers respectively provided on outer sides of the two substrates; and
a compensation film provided between the polarizer and the substrate;
wherein the phase retardation of the compensation film satisfies the following formulae (1)-(3), (6)-(8) and (11)-(13):

$$1 < R_0(450)/R_0(\lambda_0) \leq 1.3, \quad (1)$$

$$1.1 \leq R_0(650)/R_0(\lambda_0) \leq 2.1, \quad (2)$$

$$100 \text{ nm} \leq R_0(\lambda_0) \leq 240 \text{ nm} \quad (3)$$

$$1 \leq Nz(450)/Nz(\lambda_0) \leq 1.3, \quad (6)$$

$$1 \leq Nz(650)/Nz(\lambda_0) \leq 3 \quad (7)$$

$$0.1 \leq Nz(\lambda_0) \leq 0.5 \quad (8)$$

$$1 \leq Rth(450)/Rth(\lambda_0) \leq 1.2 \quad (11)$$

$$1.2 \leq Rth(650)/Rth(\lambda_0) \leq 5 \quad (12)$$

$$10 \text{ nm} \leq Rth(\lambda_0) \leq 120 \text{ nm} \quad (13)$$

wherein $R_0(450)$, $R_0(650)$ and $R_0(\lambda_0)$ represent the phase retardation of the compensation film at wavelengths of 450 nm, 650 nm and $\lambda_0$, respectively, and $\lambda_0 = [n_e - n_o] \times d/k$, where 450 nm $\leq \lambda_0 \leq$ 650 nm, and where $n_e$ and $n_o$ represent the refractive indices of the liquid crystal, d represents the cell gap defined between the two substrates and k is a constant, $0.55 \leq k \leq 1$; wherein $Nz(450)$, $Nz(650)$ and $Nz(\lambda_0)$ represent the Nz value of the compensation film at wavelengths of 380 nm, 450 nm, 650 nm and $\lambda_0$ respectively, and $Nz = [n_x - n_z]/[n_x - n_y]$ wherein $n_x$, $n_y$ and $n_z$ represent the 3-dimension refractive indices of the compensation film in the axes of X, Y and Z respectively;
wherein $Rth(450)$, $Rth(650)$ and $Rth(\lambda_0)$ represent the Rth value of the compensation film at wavelengths of 450 nm, 650 nm and $\lambda_0$ respectively, and $Rth = [n_x - n_z] \times d'$ wherein $n_x$ and $n_z$ represent the 3-dimension refractive indices of the compensation film in the axes of X and Z respectively and d' represents the thickness of the compensation film.

9. The liquid crystal display device of claim 8, wherein the phase retardation of the compensation film further satisfies the following formulae (4)-(5):

$$1 \leq R_0(380)/R_0(\lambda_0) \leq 2, \quad (4)$$

$$1.2 \leq R_0(780)/R_0(\lambda_0) \leq 2.7, \quad (5)$$

wherein $R_0(380)$ and $R_0(780)$ represent the phase retardation of the compensation film at wavelengths of 380 nm and 780 nm, respectively.

10. The liquid crystal display device of claim 8, wherein the phase retardation of the compensation film further satisfies the following formulae (9)-(10):

$$1 \leq Nz(380)/Nz(\lambda_0) \leq 2, \quad (9)$$

$$1.2 \leq Nz(780)/Nz(\lambda_0) \leq 2.7, \quad (10)$$

wherein $Nz(380)$ and $Nz(780)$ represent the Nz value of the compensation film at wavelengths of 380 nm and 780 nm, respectively.

11. The liquid crystal display device of claim 8, wherein the phase retardation of the compensation film further satisfies the following formulae (14)-(15):

$$1 \leq Rth(380)/Rth(\lambda_0) \leq 6, \quad (14)$$

$$1.8 \leq Rth(780)/Rth(\lambda_0) \leq 7.1, \quad (15)$$

wherein $Rth(380)$ and $Rth(780)$ represent the Rth value of the compensation film at wavelengths of 380 nm and 780 nm, respectively.

12. The liquid crystal display device of claim 8, wherein the compensation film is formed by combining at least two compensation films that have different wavelength dispersion properties.

13. A liquid crystal display (LCD) device, comprising:
an LCD unit having a liquid crystal layer; and
a compensation film provided next to the LCD unit and having a phase retardation, $R_0$, that satisfies:

$$1 < R_0(450)/R_0(\lambda_0) \leq 1.3,$$

$$1.1 \leq R_0(650)/R_0(\lambda_0) \leq 2.1,$$

$$100 \text{ nm} \leq R_0(\lambda_0) \leq 240 \text{ nm},$$

wherein $R_0(450)$, $R_0(650)$, and $R_0(\lambda_0)$ represent the phase retardation of the compensation film at wavelengths of 450 nm, 650 nm, and $\lambda_0$, respectively, and $\lambda_0[n_e - n_o] \times d/k$, where 450 nm $\leq \lambda_0 \leq$ 650 nm, and where $n_e$ and $n_o$ represent refractive indices of the liquid crystal layer, d represents a cell gap in the LCD unit, and k is a constant, $0.55 \leq k \leq 1$.

14. The LCD device of claim 13, further comprising polarizers, wherein the LCD unit and compensation film are provided between the polarizers.

15. The LCD device of claim 13, wherein the phase retardation of the compensation film further satisfies:

$$1 \leq R_0(380)/R_0(\lambda_0) \leq 2,$$

$$1.2 \leq R_0(780)/R_0(\lambda_0) \leq 2.7,$$

wherein $R_0(380)$ and $R_0(780)$ represent the phase retardation of the compensation film at wavelengths of 380 nm and 780 nm, respectively.

16. The LCD device of claim 13, wherein an optical parameter, Nz, of the compensation film satisfies:

$$1 \leq Nz(450)/Nz(\lambda_0) \leq 1.3,$$

$$1 \leq Nz(650)/Nz(\lambda_0) \leq 3,$$

$$0.1 \leq Nz(\lambda_0) \leq 0.5,$$

wherein $Nz(450)$, $Nz(650)$ and $Nz(\lambda_0)$ represent the Nz value of the compensation film at wavelengths of 450 nm, 650 nm and $\lambda_0$, respectively, and $Nz = [n_x - n_z]/[n_x - n_y]$, wherein $n_x$, $n_y$ and $n_z$ represent 3-dimension refractive indices of the compensation film in axes X, Y, and Z respectively.

17. The LCD device of claim 16, wherein the optical parameter, Nz, of the compensation film further satisfies:

$$1 \leq Nz(380)/Nz(\lambda_0) \leq 2,$$

$$1.2 \leq Nz(780)/Nz(\lambda_0) \leq 2.7,$$

wherein $Nz(380)$ and $Nz(780)$ represent the Nz value of the compensation film at wavelengths of 380 nm and 780 nm, respectively.

18. The LCD device of claim 13, wherein an optical parameter, Rth, of the compensation film satisfies:

$1 \leq Rth(450)/Rth(\lambda_0) \leq 1.2$, $1.2 \leq Rth(650)/Rth(\lambda_0) \leq 5$, $10 \text{ nm } Rth(\lambda_0) \leq 120 \text{ nm}$, wherein Rth(450), Rth(650) and Rth($\lambda_0$) represent the Rth value of the compensation film at wavelengths of 450 nm, 650 nm and $\lambda_0$, respectively, and Rth=$[n_x - n_z]$xd', wherein $n_x$ and $n_z$ represent 3-dimension refractive indices of the compensation film in axes X and Z, respectively, and d' represents a thickness of the compensation film.

19. The LCD device of claim 18, wherein the optical parameter, Rth, of the compensation film further satisfies:

$1 \leq Rth(380)/Rth(\lambda_0) \leq 6$, $1.8 \leq Rth(780)/Rth(\lambda_0) \leq 7.1$, wherein Rth(380) and Rth(780) represent the Rth value of the compensation film at wavelengths of 380 nm and 780 nm, respectively.

20. The LCD device of claim 13, wherein the LCD unit has two substrates, wherein the liquid crystal layer is between the two substrates, and wherein d represents the cell gap between the substrates.

* * * * *